United States Patent
Mayer et al.

(10) Patent No.: US 10,103,661 B2
(45) Date of Patent: Oct. 16, 2018

(54) WIND POWER PLANT AND A METHOD FOR OPERATING THEREOF

(71) Applicant: VESTAS WIND SYSTEMS A/S, Aarhus N. (DK)

(72) Inventors: Peter Frederick Mayer, Singapore (SG); Manoj Gupta, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 647 days.

(21) Appl. No.: 14/345,679

(22) PCT Filed: Sep. 27, 2012

(86) PCT No.: PCT/DK2012/050359
§ 371 (c)(1),
(2) Date: Mar. 19, 2014

(87) PCT Pub. No.: WO2013/044922
PCT Pub. Date: Apr. 4, 2013

(65) Prior Publication Data
US 2014/0225370 A1    Aug. 14, 2014

Related U.S. Application Data

(60) Provisional application No. 61/540,001, filed on Sep. 28, 2011.

(30) Foreign Application Priority Data

Sep. 28, 2011   (DK) .................... 2011 70534

(51) Int. Cl.
*H02P 9/00*   (2006.01)
*H02J 3/16*   (2006.01)
(Continued)

(52) U.S. Cl.
CPC .............. *H02P 9/00* (2013.01); *H02J 3/16* (2013.01); *H02J 3/386* (2013.01);
(Continued)

(58) Field of Classification Search
CPC . H02P 9/00; H02P 2101/15; H02J 3/16; H02J 3/386; Y02E 40/34; Y02E 10/763
(Continued)

(56) References Cited

U.S. PATENT DOCUMENTS 5,225,712 A       7/1993   Erdman
2003/0011348 A1   1/2003   Lof et al.
(Continued)

FOREIGN PATENT DOCUMENTS

EP   1508951 A1    2/2005
EP   1855367 A1   11/2007
(Continued)

OTHER PUBLICATIONS

Marinez Jorge, "Centralized Slope Voltage Control for a DFIG Wind Power Plant with STATCOM and Capacitor Bank", May 28, 2010.*
(Continued)

*Primary Examiner* — Thomas C Lee
*Assistant Examiner* — Alan Chu
(74) *Attorney, Agent, or Firm* — Patterson + Sheridan, LLP

(57) ABSTRACT

A wind power plant is provided. The wind power plant comprises at least one wind turbine and a power plant controller. The power plant controller is configured to detect whether a grid voltage exceeds a predefined threshold, and if it has detected that the grid voltage exceeds the predefined threshold, the power plant controller sends a reactive power reference to the at least one wind turbine, thereby causing
(Continued)

the at least one wind turbine to reduce its reactive power output in response to the reactive power reference.

20 Claims, 6 Drawing Sheets

(51) Int. Cl.
  *H02J 3/38* (2006.01)
  *H02P 101/15* (2016.01)
(52) U.S. Cl.
  CPC ......... *H02P 2101/15* (2015.01); *Y02E 10/763* (2013.01); *Y02E 40/34* (2013.01)
(58) Field of Classification Search
  USPC ........................................................ 700/297
  See application file for complete search history.

(56) References Cited

U.S. PATENT DOCUMENTS

| | | | |
|---|---|---|---|
| 2005/0040655 A1* | 2/2005 | Wilkins | F03D 7/02 290/44 |
| 2005/0146141 A1* | 7/2005 | Basteck | F16H 47/08 290/44 |
| 2005/0194944 A1* | 9/2005 | Folts | H02J 3/1828 323/209 |
| 2007/0159737 A1* | 7/2007 | Wobben | F03D 9/003 361/20 |
| 2008/0073912 A1 | 3/2008 | Fortmann et al. | |
| 2009/0001942 A1* | 1/2009 | Temma | G05F 1/70 323/211 |
| 2009/0218817 A1* | 9/2009 | Cardinal | F03D 7/028 290/44 |
| 2010/0148508 A1 | 6/2010 | Garcia | |
| 2011/0144814 A1* | 6/2011 | Menke | F03D 7/026 700/287 |
| 2012/0101640 A1* | 4/2012 | Stapelfeldt | F03D 7/0284 700/287 |
| 2014/0062086 A1* | 3/2014 | Mata Dumenjo | H02J 3/1842 290/44 |

FOREIGN PATENT DOCUMENTS

| | | | | |
|---|---|---|---|---|
| WO | 2009083446 A2 | | 7/2009 | |
| WO | WO2010085987 | * | 8/2010 | ............... F03D 7/04 |
| WO | 2010121783 A1 | | 10/2010 | |
| WO | WO2012016585 | * | 2/2012 | ............... F03D 7/00 |

OTHER PUBLICATIONS

Bogalecka E et al: "Control of reactive 6-8,15, power in double-fed machine based wind 16 park", Power Electronics and Motion Control Conference, 2008. EPE-PEMC 2008. 13th, IEEE, Piscataway, NJ, USA, Sep. 1, 2008 (Sep. 1, 2008), pp. 1975-1980.

Li Wang et al: Dynamic-stability enhancement and reactive power/ voltage control of a large-scale wind farm using a STATCOW, North American Power Symposium (NAPS), 2010, IEEE, Piscataway, NJ, USA, Sep. 26, 2010 (Sep. 26, 2010), pp. 1-8.

International Search Report for PCT/DK2012/050359, dated Jan. 30, 2013.

Danish Search Report for PA 2011 70534, dated Jun. 29, 2012.

* cited by examiner

WIND POWER PLANT AND A METHOD FOR OPERATING THEREOF

FIELD OF THE INVENTION

The present invention relates generally to a wind power plant, and in particular, to a method for operating a wind power plant in the event of grid overvoltage.

BACKGROUND OF THE INVENTION

Temporary Over Voltage (TOV) is a situation where voltage of a transmission grid increases above its nominal voltage. This may occur, for example, due to switching off large loads or one of the transmission lines. When the voltage at a wind turbine becomes too high, it may result in large current flowing into the converters of the turbine and damaging the components therein. Therefore, it is common for wind turbines to disconnect from the grid when the grid voltage increases above a certain threshold or when the current flowing into the converters becomes too high.

However disconnection from the grid is no longer desirable as more grid codes require wind farms to remain connected to the grid during a TOV event. Wind turbines having converters may have some capability to consume reactive power, and hence such turbines may individually monitor the grid voltage (or stator voltage or voltage at the primary or secondary side of the turbine transformer). If the turbine has detected a TOV event, it controls its converter to consume reactive power in order to ride through the TOV event.

Grid code requirements are usually stipulated at the wind farm level and not at the turbine level, and wind farms are expected to comply with the grid code requirements at a point of common coupling (PCC) between the wind farm and the grid. As each wind turbine attempts to ride through the TOV event on its own, there is no coordinated effort at the wind farm level. Hence there is no guarantee that the wind farm is able to remain connected to the grid during such TOV event.

Hence it is desirable to have a coordinated way of handling TOV event at a wind farm level.

SUMMARY OF THE INVENTION

According to a first aspect of the invention, a wind power plant is provided. The wind power plant comprises at least one wind turbine and a power plant controller. The power plant controller is configured to detect whether a grid voltage exceeds a predefined threshold, and if it is detected that the grid voltage exceeds the predefined threshold, the power plant controller sends a reactive power reference to the at least one wind turbine, thereby causing the at least one wind turbine to reduce its reactive power in response to the reactive power reference.

According to a second aspect of the invention, a method for operating a wind power plant is provided. The wind power plant comprises at least one wind turbine and a power plant controller. The method comprises detecting whether a grid voltage exceeds a predefined threshold, and sending a reactive power reference from the power plant controller to the at least one wind turbine when it is detected that the grid voltage exceeds the predefined threshold, thereby causing the at least one wind turbine to reduce its reactive power output in response to the reactive power reference.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

Figure 1:
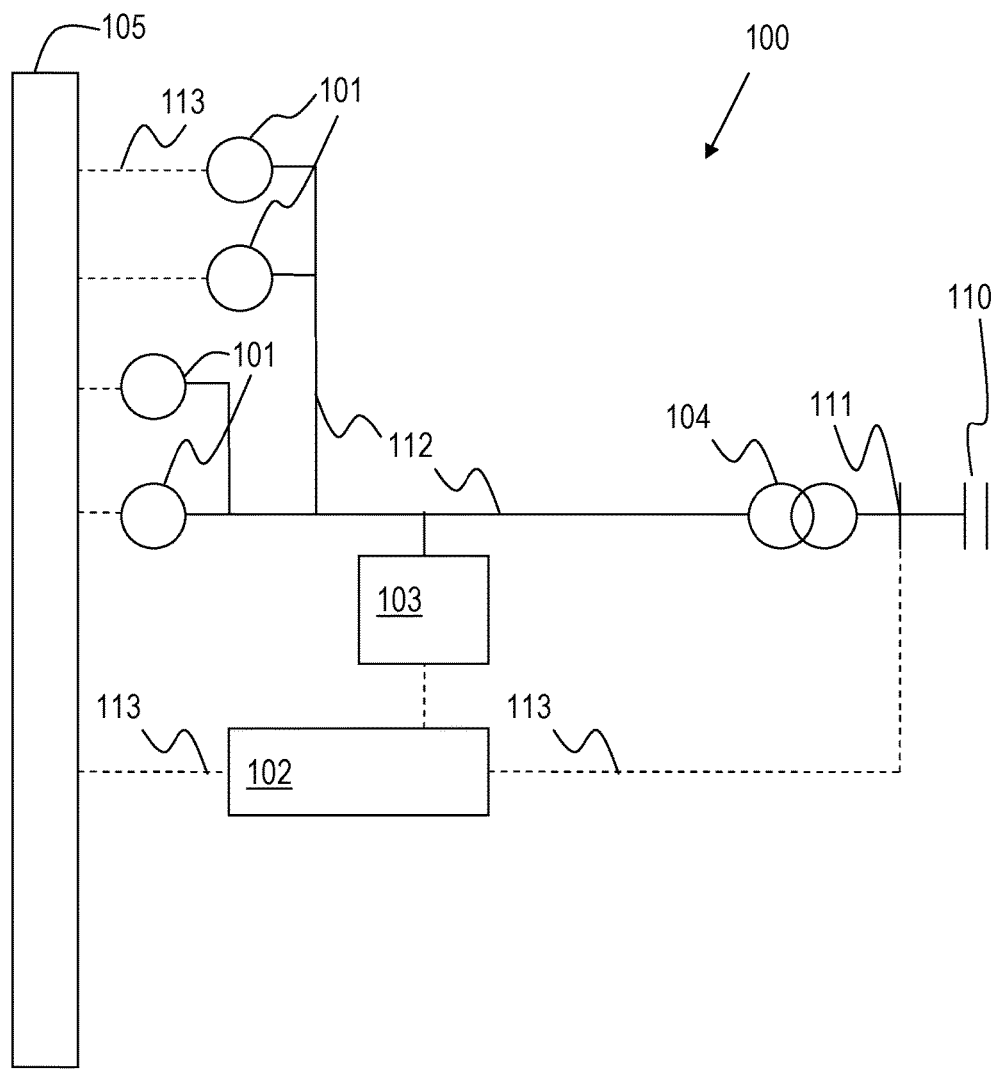
FIG. 1 shows a general layout of a wind power plant.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In the first aspect, a wind power plant is provided. The wind power plant comprises at least one wind turbine and a power plant controller. The power plant controller is configured to detect whether a grid voltage exceeds a predefined threshold, and if it is detected that the grid voltage exceeds the predefined threshold, the power plant controller sends a reactive power reference to the at least one wind turbine, thereby causing the at least one wind turbine to reduce its reactive power output in response to the reactive power reference.

In the first aspect, the power plant controller (PPC) of the wind power plant (WPP) is used to control the voltage at the wind turbine by reducing the reactive power output of the wind turbine in the event of a temporary over voltage (TOV). Specifically, when the PPC detects that there is a TOV event, it sends a reactive power reference to the wind turbine. In response to this reactive power reference, the wind turbine reduces its reactive power output. As the reactive power output of the turbine is reduced, the voltage at the turbine is also reduced. As a result, the turbine is able to remain connected to the grid during the TOV event.

When there are more than one wind turbines in the wind power plant, the PPC may send a reactive power reference comprising different reactive power setpoints to each wind turbine. The different reactive power setpoints may be predetermined, based on the location of the wind turbines in the WPP, the conditions of the WPP or any other factors.

As the voltage at the wind turbine is controlled using the PPC (outer loop) and not by the wind turbine directly (inner loop), the first aspect of the invention provides a simple and yet coordinated manner of keeping the wind turbine, and hence the wind power plant, connected to the grid during a TOV event.

If the wind power plant did not handle the TOV event by the outer loop, the TOV event may propagate to the individual wind turbine(s), and it is left to the wind turbine to handle the TOV event on its own. If there is a plurality of wind turbines in the wind power plant, some wind turbines may handle the TOV event differently from the other wind turbines. This is especially true as different wind turbines in the wind power plant may experience different voltage increase due to the location of the wind turbines in the wind power plant and hence different electrical impedances between the wind turbines and the grid. For example, the wind turbines may disconnect from the network, absorbs different amount of reactive power to reduce the voltage, or do nothing and hence run the risk of damage to the internal components of the turbine. Thus by having such a coordinated control at the wind power plant level according to the first aspect of the invention, the problems associated with the individual behavior of the wind turbines are avoided and the behavior of the wind power plant during the TOV event as a whole is predictable.

According to an embodiment, the at least one wind turbine absorbs reactive power in response to the reactive power reference from the power plant controller. In this embodiment, reducing the reactive power output of the wind turbine includes absorbing reactive power. Accordingly, the voltage at the wind turbine is reduced to a desired or acceptable level. It should also be noted the wind turbine absorbs or reduces its reactive power in response to the reactive power reference during the TOV event according to the embodiment. It need not detect the voltage to determine whether there is a TOV event, and decide how much reactive power to absorb in order to ride through the TOV event. Therefore the embodiment provides a very simple manner of handling the TOV event, and no complicated control is needed at the turbine level.

According to an embodiment, the power plant controller is further configured to send an active power reference to the at least one wind turbine when it is detected that the grid voltage exceeds the predefined threshold, thereby causing the at least one wind turbine to reduce its active power output in response to the active power reference. By reducing the active power output of the wind turbine, the wind turbine is able to absorb more reactive power during the TOV event. Thus as a whole, the reactive power absorbed at the wind power plant level is increased. This increases the ride through capability of the wind power plant.

According to an embodiment, the at least one wind turbine reduces its active power output to substantially 0.8 pu in response to the active power reference from the power plant controller. At 0.8 pu of the active power, the wind turbine is able to absorb the maximum reactive power. This is useful when the wind turbine is producing more than 0.8 pu of active power, and more reactive power is required to be absorbed.

According to an embodiment, the power plant controller is further configured to reduce a time interval for sending the reactive power reference to the at least one wind turbine. The power plant controller usually sends the reactive power reference (containing the reactive power setpoint) to the wind turbines at a fixed time interval. This time interval is usually determined based on the controller's execution speed, communication speed of the plant network and a response time of the wind turbines. By reducing the time interval for sending the power reference of the PPC, the reactive power reference to the wind turbine can be reduced at a faster rate, resulting in the wind turbine to be able to reduce or absorb the reactive power at a faster rate. This ensures a faster response of the wind power plant to the TOV event. A fast response also ensures that the wind turbine is protected from the TOV event, and also prevents damages to its components.

According to an embodiment, the wind power plant further comprises a reactive power source, and wherein the power plant controller is configured to control the reactive power source to supply inductive power when it is detected that the grid voltage exceeds the predefined threshold. The reactive power source further adds to the capability of the wind power plant to remain connected to the grid during the TOV event. When the reactive power absorbed by the wind turbine is insufficient for the wind power plant to ride through the TOV event, the reactive power source is used to further absorb reactive power by supplying inductive power. It should be noted that priority for reactive power handling should be given to the wind turbine. It is only in the event when the wind turbine is unable to fully absorb the reactive current the reactive power source is used.

According to an embodiment, the reactive power source comprises at least one of an inductor bank and a Static Compensator (STATCOM).

According to an embodiment, the power plant controller is configured to remove a predefined reactive power limit of the wind power plant. The reactive power output of a wind power plant may be limited to a certain value by an operator, in order to restrict the power output of the wind power plant to a certain power factor. According to the embodiment, such a limit on the reactive power output is removed. This allows the wind power plant to absorb the required amount of reactive power in order to ride through the TOV event, even if the required amount of reactive power is larger than the normal reactive power limit of the wind power plant. This limit on the reactive power output is removed temporarily according to an embodiment.

According to an embodiment, the power plant controller is configured to detect the grid voltage at a point of common coupling of the wind power plant.

In the second aspect of the invention, a method for operating a wind power plant is provided. The wind power plant comprises at least one wind turbine and a power plant controller. The method comprises detecting whether a grid voltage exceeds a predefined threshold, and sending a reactive power reference from the power plant controller to the at least one wind turbine when it is detected that the grid voltage exceeds the predefined threshold, thereby causing the at least one wind turbine to reduce its reactive power output in response to the reactive power reference.

According to an embodiment, the method further comprises absorbing reactive power by the at least one wind turbine in response to the reactive power reference from the power plant controller.

According to an embodiment, the method further comprises sending an active power reference from the power plant controller to the at least one wind turbine when it is detected that the grid voltage exceeds the predefined threshold, thereby causing the at least one wind turbine to reduce its active power output in response to the active power reference.

According to an embodiment, the method further comprises reducing the active power output of the at least one wind turbine to substantially 0.8 pu in response to the active power reference from the power plant controller.

According to an embodiment, the method further comprises reducing a time interval of sending the reactive power reference from the power plant controller to the at least one wind turbine.

According to an embodiment, the method further comprises supplying inductive power from a reactive power source when it is detected that the grid voltage exceeds the predefined threshold.

According to an embodiment, the method further comprises removing a reactive power limit of the wind power plant.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 illustrates a general layout of a wind power plant 100. The wind power plant 100 includes a plurality of wind turbines 101 (such as the wind turbine shown in FIG. 2), a power plant controller (PPC) 102, a wind power plant transformer 104 and a plant network 105. The wind power plant 100 is connected to a utility system or grid 110 via power lines 112 (also known as the medium voltage bus) and through the plant transformer 104. The interface point between the wind farm 100 and the utility system 110 is called the point of common coupling (PCC) 111. Power produced by the wind turbines 101 are distributed over the power lines 112 and provided to grid 110 via the PCC 111. The plant transformer 104 steps up or down the voltage from the wind power plant 100 into a voltage suitable for transmission in the grid 110.

The wind power plant 100 may further include compensation devices 103. The compensation device is a reactive power generation device used to compensate reactive power or control the power factor of the wind power plant 100. Examples of the compensation device 103 include but not limited to a thyristor switched capacitor bank, a static VAR compensator (SVC), a shunt reactor and a Static Compensator (STATCOM). The reactive power from the compensation device 103 is also delivered to the grid 110 over power lines 112.

The PPC 102 generally fulfills a plurality of control functions. For example, the PPC 102 may collect different types of data which characterizes the current state of the wind turbines 101 or components thereof, and in response thereto control the operation of the wind turbines 101. The wind turbines 101 communicate with the PPC 102 through the plant network 105 using control lines 113 shown as dotted lines in FIG. 1. The signals communicated between the PPC 102 and the wind turbines 101 may include power output signal, turbine status, active/reactive power reference, turbine command, active/reactive power setpoints, etc. The PPC 102 is also connected to the PCC 111 via control line 113. This allows the PPC 102 to detect power parameters such as voltage and current levels at the PCC 111.

It should be noted that the layout of the wind power plant 100 shown in FIG. 1 is only an example, and the invention is not restricted to the exact layout of the wind power plant shown in FIG. 1. For example, although four wind turbines 101 are shown in the wind power plant 100, it is possible that the wind power plant includes more or less than four wind turbines 101. It is also possible that the wind power plant only has one wind turbine 101. Similarly, the wind farm 101 may include none or more than 1 compensation devices in other examples.

Figure 2:
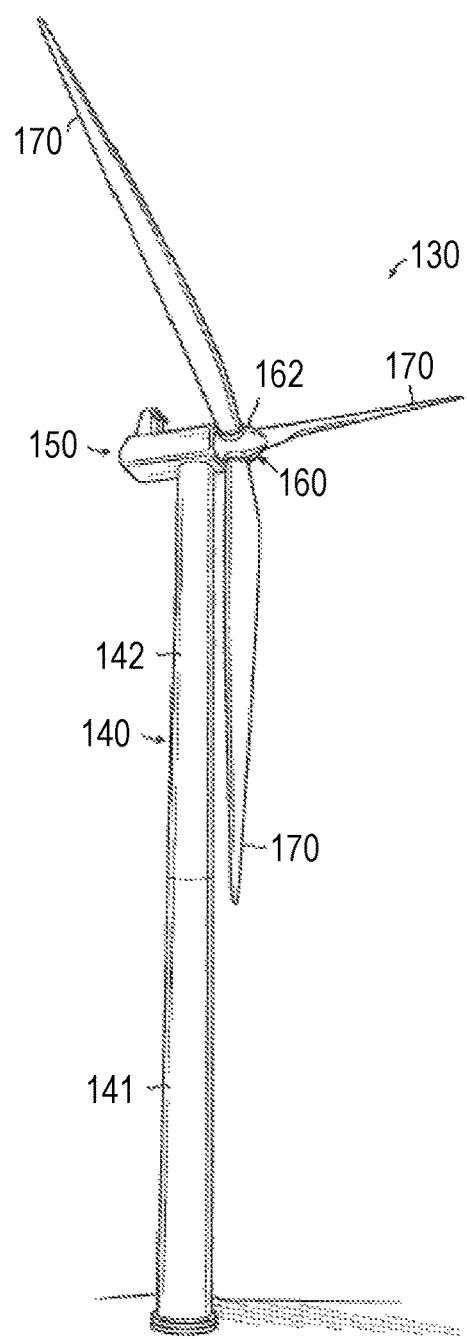
FIG. 2 shows an exemplary structure of a wind turbine.

FIG. 2 illustrates an exemplary wind turbine 130 according to an embodiment. As illustrated in FIG. 2, the wind turbine 130 includes a tower 140, a nacelle 150, and a rotor 160. In one embodiment, the wind turbine 130 may be an onshore wind turbine. However, embodiments of the invention are not limited only to onshore wind turbines. In alternative embodiments, the wind turbine 130 may be an offshore wind turbine located over a water body such as, for example, a lake, an ocean, or the like. The tower 140 of such an offshore wind turbine is installed on either the sea floor or on platforms stabilized on or above the sea level.

The tower 140 of wind turbine 130 may be configured to raise the nacelle 150 and the rotor 160 to a height where strong, less turbulent, and generally unobstructed flow of air may be received by the rotor 160. The height of the tower 140 may be any reasonable height, and should consider the length of wind turbine blades extending from the rotor 160. The tower 140 may be made from any type of material, for example, steel, concrete, or the like. In some embodiments the tower 140 may be made from a monolithic material. However, in alternative embodiments, the tower 140 may include a plurality of sections, for example, two or more tubular steel sections 141 and 142, as illustrated in FIG. 2.

The rotor 160 may include a rotor hub (hereinafter referred to simply as the "hub") 162 and at least one blade 170 (three such blades 170 are shown in FIG. 2). The rotor hub 162 may be configured to couple the at least one blade 170 to a shaft (not shown). In one embodiment, the blades 170 may have an aerodynamic profile such that, at predefined wind speeds, the blades 170 experience lift, thereby causing the blades to radially rotate around the hub. The hub 170 further comprises mechanisms (not shown) for adjusting the pitch of the blade 170 to increase or reduce the amount of wind energy captured by the blade 170. Pitching adjusts the angle at which the wind strikes the blade 170. It is also possible that the pitch of the blades 170 cannot be adjusted. In this case, the aerodynamic profile of the blades 170 is designed in a manner that the lift experienced by the blades are lost when the wind speed exceeded a certain threshold, causing the turbine to stall.

The hub 162 typically rotates about a substantially horizontal axis along a drive shaft (not shown) extending from the hub 162 to the nacelle 150. The drive shaft is usually coupled to one or more components in the nacelle 150, which are configured to convert and the rotational energy of the shaft into electrical energy.

Although the wind turbine 130 shown in FIG. 2 has three blades 170, it should be noted that a wind turbine may have different number of blades. It is common to find wind turbines having two to four blades. The wind turbine 130 shown in FIG. 2 is a Horizontal Axis Wind Turbine (HAWT) as the rotor 160 rotates about a horizontal axis. It should be noted that the rotor 160 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 170 in the rotor 160.

Figure 3:
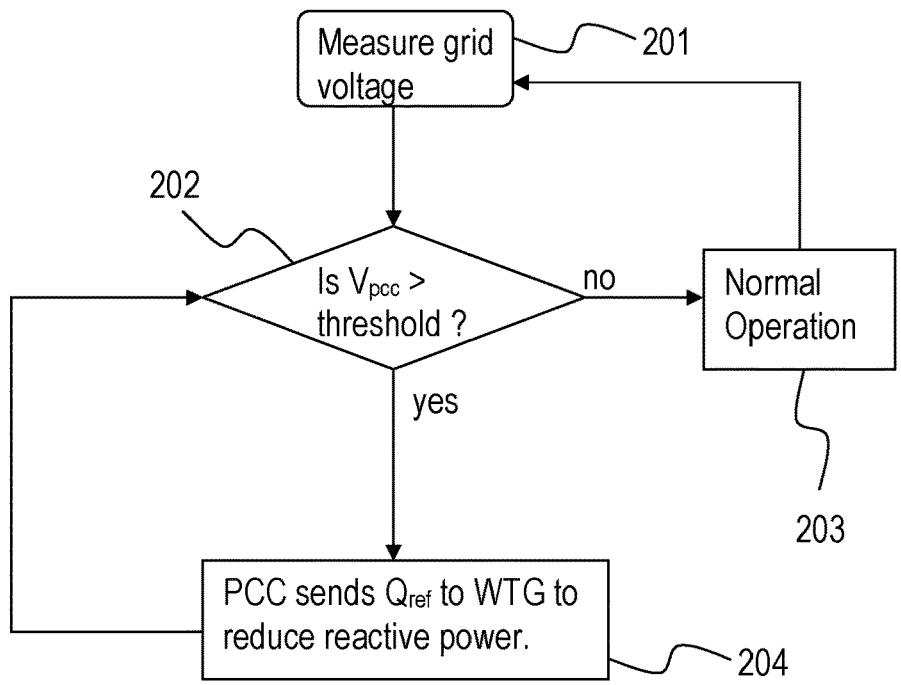
FIG. 3 shows a flow-chart of a method for controlling the operating of a wind power plant according to an embodiment.

FIG. 3 shows a flow-chart of a method for controlling the operating of a wind power plant according to an embodiment. The method may be implemented in the wind power plant 100 described with reference to FIG. 1. Specifically, the PPC 102 may be configured to control the operation of the wind power plant 100 according to the embodiment.

Step 201 includes monitoring the grid voltage. The grid voltage is usually measured at the PCC 111 of the wind power plant 100 by the PPC 102. Step 202 includes detecting whether the grid voltage exceeds a predefined threshold voltage. The predefined threshold voltage may be defined based on grid code requirements on High Voltage Ride Through (HVRT). The HVRT requirement of the grid code dictates the temporary over-voltage (TOV) ranges and the corresponding time durations a wind power plant (WPP) must remain connected to the grid.

Figure 4:
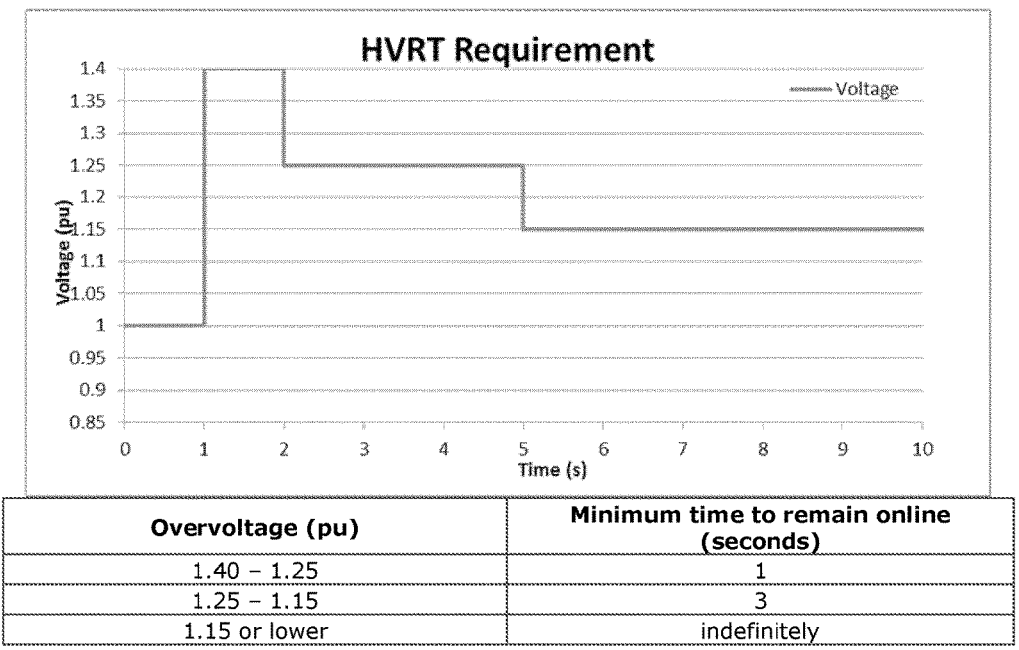
FIG. 4 shows an example of a HVRT requirement of a grid code.

An example of the HVRT requirement of a grid code is shown in FIG. 4. It can be seen from FIG. 4 that if the TOV range is below 1.15 pu, the WPP must not disconnect from the grid. If the TOV range is between 1.15 pu and 1.25 pu, the WPP must remain connected to the grid for a minimum duration of 3 seconds. If the TOV range is between 1.25 pu and 1.40 pu, the WPP must remain connected to the grid for a minimum duration of 1 second. Beyond these TOV ranges or the corresponding minimum durations, the WPP is allowed to disconnect from the grid. Therefore in this example, the predefined threshold voltage may be defined as 1.15 pu. Accordingly, Step 202 includes detecting whether the grid voltage exceeds 1.15 pu.

If the grid voltage or the voltage at the PCC 111 detected in Step 202 does not exceed the predefined threshold voltage, the WPP 100 continues its normal operation in Step 203, and the PPC 102 continues to monitor the grid voltage at Step 201. If it is detected at Step 202 that the grid voltage or the voltage at the PCC 111 exceeds the predefined threshold voltage, the PPC 102 sends a reactive power reference to the wind turbines 101 in the WPP 100 at Step 204. The reactive power reference from the PPC 102 comprises a reactive power setpoint. Upon receiving the reactive power reference from the PPC 102, the wind turbines 101 control their operation to increase or decrease their reactive power according to the reactive power setpoint. The wind turbines 101 may be further controlled by a sub-controller in a closed-loop control to meet the reactive power setpoint from the PPC 102 according to an embodiment.

According to the embodiment, the PPC 102 sends the reactive power reference with reduced reactive power setpoint to the wind turbines 101 when it is detected that the grid voltage exceeds the predefined threshold voltage. In response to the reactive power reference, the wind turbines 101 reduce their reactive power accordingly. Specifically, the wind turbines 101 absorb reactive power and the voltage at the wind turbines is reduced accordingly. This results in the voltage at the PCC to also be reduced accordingly.

The PPC 102 may be operating in several Q control modes during normal operation. According to an embodiment, when it is detected that the grid voltage exceeds the threshold voltage, the PPC 102 is switched to a voltage control mode and send the reactive power reference to the wind turbines 101 in order to reduce the reactive power. For example, the PPC 102 is switched into a closed-loop control mode with a voltage reference. In this control mode the reactive power is adjusted to achieve a given voltage setpoint. After the TOV event is over, the PPC 102 returns to the previous operating mode and resume the previous setpoints and operation. In another example, the PPC 102 is switched to an open-loop control mode. In this open-loop control mode, the reactive power reference is determined based on the measured grid voltage, either by mathematical equation or through a look-up table.

The PPC 102 may also send an active power reference to some or all the wind turbines to reduce their active power according to one embodiment. By reducing the active power output of the wind turbines 101, more reactive power can be absorbed according to the PQ capability of the wind turbines 101. This results in the voltage at the PCC 111 of the WPP 100 to be lowered further. The reduction of active power of the wind turbines 101 is advantageous in the event when the wind turbines 101 are not able to reduce their reactive power to a level required for the WPP 100 to remain connected to the grid. The maximum reactive power that can be absorbed by a wind turbine is at about 0.8 pu of the active power output of the wind turbine. Hence according to a further embodiment, the PPC 102 sends an active power reference to the wind turbines 101 to reduce the active power output of the wind turbines to substantially 0.8 pu.

Additionally or alternatively, the PPC 102 may also control the compensation device 103 to absorb reactive power (or supply inductive power). This is advantageous in the event when the wind turbines 101 are not able to reduce their reactive power to a level required for the WPP 100 to remain connected to the grid. The reactive power unable to be absorbed by the wind turbines 101 may be absorbed by the compensation device 103. As mentioned earlier, the compensation device 103 includes but not limited to a thyristor switched capacitor bank, a static VAR compensator (SVC), a Static Compensator (STATCOM) and shunt reactor.

When the PPC 102 sends a power reference to reduce the power setpoint from an initial value, the power setpoint is reduced in steps according to the sampling time or a fixed time interval of the PPC. This means that the longer the time interval, the slower the power setpoint is reduced. According to an embodiment, this time interval is reduced. This results in the power setpoint to be reduced at a faster rate, resulting in a faster response of the wind turbines during the TOV event. As mentioned earlier, a faster response of the wind turbines in decreasing/absorbing reactive power during the TOV event reduces the risk of component damage of the wind turbines. As an example, the sampling time or the time interval of the PPC 102 may be 0.1 s. According to the embodiment, the time interval for sending the power reference is decreased to 0.02 s.

Normally in a WPP, the reactive power at the PCC is limited according to a Power Factor (PF) requirement, for example at +/−0.95. This means that under normal condition, a WPP is allowed to generate or absorb up to 0.329 pu reactive power at the PCC. However under a TOV event, the WPP may require more reactive power to be absorbed to remain connected. According to an embodiment, this reactive power limit at the PCC may be removed temporarily, and the WPP is able to absorb as much reactive power as required (e.g. up to 1.0 pu) to ride through the TOV event.

The reduction or absorption of reactive power by the wind turbines 101 results in the overall reduction of the voltage at the WPP 100. Thus WPP 100 is able to remain connected to the grid during the TOV event. The PPC 102 continues to monitor the grid voltage at Step 202 to determine whether the predefined threshold voltage is still exceeded.

A simulation to verify the method according to the embodiments will now be described with reference to FIG. 5a, FIG. 5b and FIG. 5c. In this simulation, a grid connected WPP includes a plurality of wind turbines, a PPC, a capacitor bank and a 6 MVAR reactor. The WPP was operating at 0.85 power factor at the PCC, and one 6 MVAR capacitor bank was in service. At 12.0 s, a low voltage fault was applied near to the PCC in the grid. At 12.4 s, the fault was cleared and a transmission line was opened. This resulted in an over-voltage condition at the PCC. The frequency of the system was increased to 61 Hz.

Figure 5A:
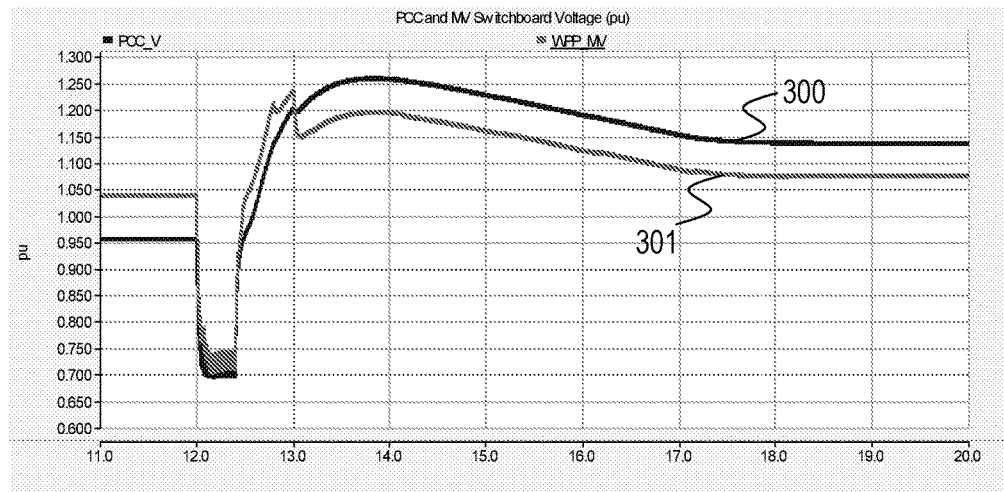
FIG. 5a shows a chart illustrating the grid voltage measured at a point of common coupling of the wind power plant and the voltage at a medium voltage (MV) bus of the wind power plant according to an embodiment.

FIG. 5a shows a chart illustrating the grid voltage measured at the PCC and the voltage at a medium voltage (MV) bus of the WPP according to an embodiment. The MV bus corresponds to the voltage of the wind turbines in the WPP. The graph 300 in FIG. 5a shows the voltage profile at the PCC. Before the fault at 12.0 s, the steady state voltage at the PCC was at 0.95 pu. At 12.0 s, the fault was applied and the voltage at the PCC was reduced to about 0.70 pu accordingly. After the fault was cleared and the additional line was opened at 12.4 s, the voltage throughout the grid was increased. This resulted in the voltage at the PCC to be increase to more than 1.25 pu for 1 s, and then gradually reduced to 1.15 pu in the next 3 s.

The graph 301 in FIG. 5a shows the voltage profile at the MV bus. Before the fault at 12.0 s, the WPP was supplying reactive power and hence the voltage at the MV bus was at 1.04 pu. During the fault at 12.0 s, the voltage at the MV bus was reduced due to the reduction of the voltage at the PCC. After the fault was cleared at 12.4 s, the voltage at the MV bus was increased due to the increase of the voltage at the PCC. At 12.8 s when the voltage at the MV bus was more than 1.15 pu for 100 ms, the MVAR reactor was switched in. At 13.0 s, the PPC took out the capacitor bank and resulted in the reduction of the voltage at the MV bus. The voltage at the MV bus then followed the profile of the voltage at the PCC with a gap of approximately 0.6 pu.

Figure 5B:
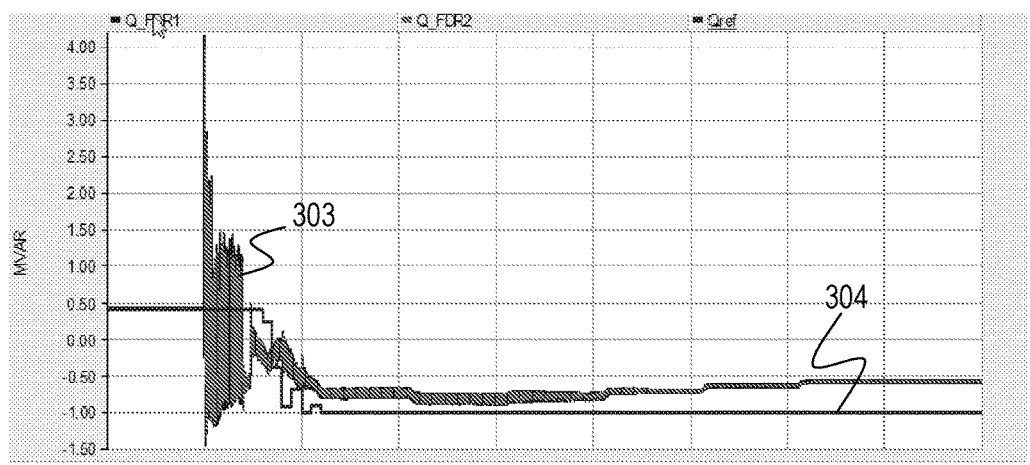
FIG. 5b shows a chart illustrating the reactive power at the output terminals of the wind turbines in the wind power plant and the reactive power reference sent from the power plant controller of the wind power plant according to an embodiment.
Figure 5C:
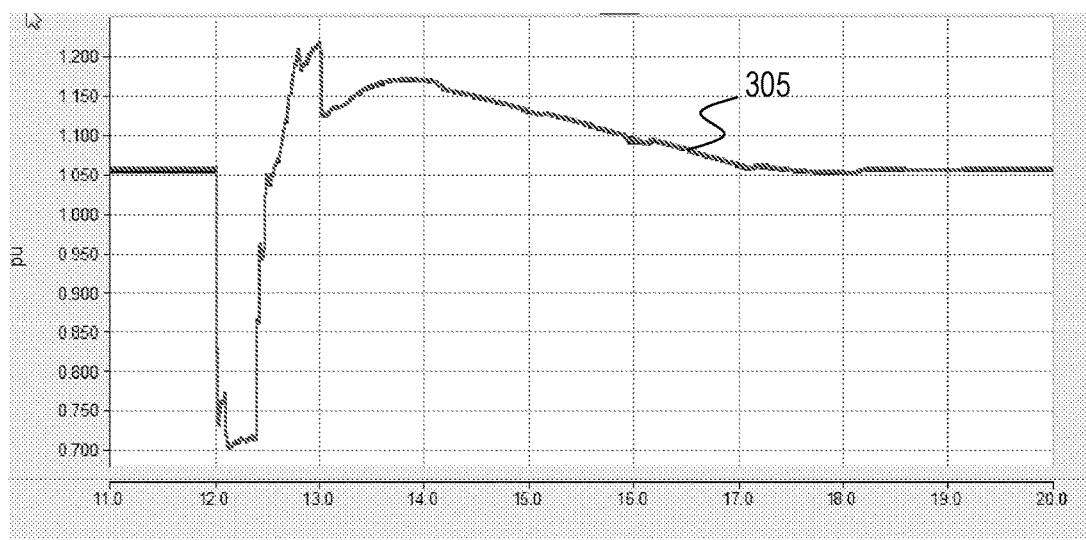
FIG. 5c shows a graph illustrating the voltage at the output terminals of the wind turbines according to an embodiment.

FIG. 5b shows a chart illustrating the reactive power at the output terminals of the wind turbines in the WPP and the reactive power reference sent from the PPC of the WPP according to an embodiment. The graph 303 shows the reactive power at the output terminals of the wind turbines, and the graph 304 shows the reactive power reference ($Q_{ref}$). FIG. 5c shows a graph 305 illustrating the voltage at the output terminals of the wind turbines according to an embodiment.

Before the fault at 12.0 s, the wind turbines were operating at 0.406 MVAR and the capacitor bank was in service to maintain the power factor at 0.85 at the PCC. During the fault at 12.0 s, the wind turbines started supplying reactive power in response to the low voltage fault to support the grid. The voltage at the output terminals of the wind turbines thus dropped to 0.70 pu. After the fault was cleared at 12.4 s, the voltage at the output terminals increased due to the increase of the voltage at the PCC. The $Q_{ref}$ from the PPC was then reduced in order to maintain the voltage at the PCC to a set reference. The wind turbines followed the $Q_{ref}$ and started absorbing reactive power until it hit the maximum value of −0.6 MVAR.

At 14.0 s, the system frequency is increased and caused a reduction of the active power reference $P_{ref}$ from the PPC to the wind turbines, resulting in a reduction of the active power output from the wind turbines. By reducing the active power output of the wind turbines, more reactive power can be absorbed by the wind turbines due to the PQ capability. Accordingly, the reactive power is further reduced to −0.8 MVAR slightly after 14.0 s. This further absorption of reactive power by the wind turbines further lowered the output voltage of the wind turbines to below 1.15 pu and eventually to within the steady state limit of 1.1 pu. When the system frequency is recovered back to 60 Hz, the $P_{ref}$ is increased accordingly. The increase in $P_{ref}$ also resulted in an increase in the reactive power of the wind turbines (or decreased absorption of reactive power). The reactive power of the wind turbines settled to a steady state at −0.55 MVAR while the voltage at the PCC is just below 1.15 pu. Therefore, the WPP remained connected to the grid during the TOV event according to the embodiments.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

What is claimed is:

1. A wind power plant, the wind power plant comprising:
    at least two wind turbines; and
    a power plant controller arranged to provide a coordinated handling of a temporary over-voltage (TOV) event at a wind power plant level, wherein the power plant controller is configured to:
        detect whether a grid voltage exceeds a predefined threshold voltage value;
        when a TOV event is detected corresponding to the grid voltage exceeding the predefined threshold voltage value, send respective reactive power references to the at least two wind turbines based on the TOV event, thereby causing each of the at least two wind turbines to reduce a respective reactive power output; and
    after determining that reducing the respective reactive power outputs does not lower the grid voltage below the predefined threshold voltage value, send respective active power references to the at least two wind turbines to increase the reactive power absorbed by the at least two wind turbines.

2. The wind power plant according to claim 1, wherein the at least two wind turbines absorb reactive power in response to the respective reactive power references sent from the power plant controller.

3. The wind power plant according to claim 2, further comprising:
    a reactive power source,
    wherein the power plant controller is further configured to control the reactive power source to supply inductive power upon determining that an amount of reactive power absorbed by the at least two wind turbines is insufficient to ride through the TOV event.

4. The wind power plant according to claim 1, wherein sending the respective active power references to the at least two wind turbines causes the at least two wind turbines to reduce respective active power outputs.

5. The wind power plant according to claim 4, wherein each of the at least two wind turbines reduces the respective active power output to a level corresponding to a predetermined maximum reactive power that can be absorbed by a wind turbine.

6. The wind power plant according to claim 5, wherein the level is substantially 0.8 pu.

7. The wind power plant according to claim 1, wherein the power plant controller is further configured to:
reduce, responsive to detecting the TOV event, a time interval for sending the respective reactive power references to the at least two wind turbines to below a sampling time of the power plant controller.

8. The wind power plant according to claim 1, further comprising:
a reactive power source, wherein the power plant controller is further configured to control the reactive power source to supply inductive power when the TOV event is detected.

9. The wind power plant according to claim 8, wherein the reactive power source comprises at least one of an inductor bank and a Static Compensator (STATCOM).

10. The wind power plant according to claim 1, wherein the power plant controller is further configured to remove a reactive power limit of the wind power plant.

11. The wind power plant according to claim 10, wherein the power plant controller is further configured to reapply the reactive power limit after completion of the TOV event.

12. The wind power plant according to claim 1, wherein the power plant controller is further configured to measure the grid voltage at a point of common coupling of the wind power plant.

13. The wind power plant according to claim 1, wherein the grid voltage corresponds to an electrical grid coupled with the wind power plant, and
wherein respective electrical responses of each of the at least two wind turbines are based on respective electrical impedances between the electrical grid and each of the at least two wind turbines.

14. A method for operating a wind power plant, the wind power plant comprising at least two wind turbines and a power plant controller arranged to provide a coordinated handling of a temporary over-voltage (TOV) event at a wind power plant level, the method comprising:
detecting whether a grid voltage exceeds a predefined threshold voltage value;
when a TOV event is detected, corresponding to the grid voltage exceeding the predefined threshold voltage value, sending respective reactive power references from the power plant controller to the at least two wind turbines based on the TOV event, thereby causing each of the at least two wind turbines to reduce a respective reactive power output; and
after determining that reducing the respective reactive power outputs does not lower the grid voltage below the predefined threshold voltage value, sending respective active power references to the at least two wind turbines to increase the reactive power absorbed by the at least two wind turbines.

15. The method for operating a wind power plant according to claim 14, further comprising absorbing reactive power by the at least two wind turbines in response to the respective reactive power references sent from the power plant controller.

16. The method for operating a wind power plant according to claim 14, wherein sending the respective active power references from the power plant controller to the at least two wind turbines causes the at least two wind turbines to reduce respective active power outputs.

17. The method for operating a wind power plant according to claim 16, further comprising:
reducing the respective active power outputs of the at least two wind turbines to substantially 0.8 pu in response to the respective active power references from the power plant controller.

18. The method for operating a wind power plant according to claim 14, further comprising:
reducing, responsive to detecting the TOV event, a time interval for sending the respective reactive power references from the power plant controller to the at least two wind turbines to below a sampling time of the power plant controller.

19. The method for operating a wind power plant according to claim 14, further comprising:
supplying inductive power from a reactive power source when the TOV event is detected.

20. The method for operating a wind power plant according to claim 14, further comprising removing a reactive power limit of the wind power plant.

* * * * *